United States Patent [19]

Qureshi et al.

[11] Patent Number: 5,268,223

[45] Date of Patent: *Dec. 7, 1993

[54] TOUGHENED FIBER-REINFORCED COMPOSITES

[75] Inventors: Shahid P. Qureshi, Alpharetta; Richard E. Hoffman, Cumming; Richard H. Newman-Evans, Alpharetta, all of Ga.

[73] Assignee: Amoco Corporation, Chicago, Ill.

[*] Notice: The portion of the term of this patent subsequent to May 31, 2009 has been disclaimed.

[21] Appl. No.: 708,473

[22] Filed: May 31, 1991

[51] Int. Cl.$^5$ .................. B32B 5/22; B32B 27/38; C08L 63/00; C08K 7/22

[52] U.S. Cl. ............................ 428/283; 428/292; 428/297; 428/302; 428/327; 428/413; 523/440; 524/495; 525/107

[58] Field of Search ............... 428/240, 283, 292, 294, 428/327, 297, 302, 413; 525/107, 122; 523/440; 524/495

[56] References Cited

U.S. PATENT DOCUMENTS

| | | | |
|---|---|---|---|
| 2,359,877 | 10/1944 | Schupp, Jr. | 260/29 |
| 4,448,948 | 5/1984 | Tsubaki et al. | 528/95 |
| 4,454,249 | 6/1984 | Suzuki et al. | 521/54 |
| 4,517,321 | 5/1985 | Gardner et al. | 523/400 |
| 4,579,885 | 4/1986 | Domeier et al. | 523/400 |
| 4,604,319 | 8/1986 | Evans et al. | 428/290 |
| 4,656,208 | 4/1987 | Chu et al. | 523/400 |
| 4,680,076 | 7/1987 | Bard . | |
| 4,686,250 | 8/1987 | Qureshi | 523/440 |
| 4,770,922 | 9/1988 | Hatakeyama et al. | 428/211 |
| 4,783,506 | 11/1988 | Gawin | 525/109 |
| 4,831,061 | 5/1989 | Hilaire et al. | 521/56 |
| 4,863,787 | 9/1989 | Gawin | 428/240 |
| 4,940,740 | 7/1990 | Folda et al. | 523/428 |
| 4,957,801 | 9/1990 | Maranci et al. | 428/147 |
| 4,977,218 | 12/1990 | Gardner et al. | 525/329.3 |
| 5,087,657 | 2/1992 | Qureshi et al. | 524/508 |

FOREIGN PATENT DOCUMENTS

| | | |
|---|---|---|
| 0274899 | 7/1988 | European Pat. Off. . |
| 0351025 | 1/1990 | European Pat. Off. . |
| 0377194 | 7/1990 | European Pat. Off. . |
| 49132669 | 5/1976 | Japan . |
| 62-243025 | 10/1987 | Japan . |
| 8502184 | 5/1985 | PCT Int'l Appl. . |
| 1306231 | 2/1973 | United Kingdom . |

OTHER PUBLICATIONS

Tough Resin/Carbon Fibre Composites, Muraki, et al., published in "High Tech, the Way into the Nineties", K. Brunsch, et al. Elsevier Science Publishers B.V., Amsterdam, 1986, pp. 163–176.

"Development of Damage Tolerant Composites-A Systematic Approach", Diamont and Moulton, 29th National SMAPE Symposium, Apr. 3–5, 1984.

*Primary Examiner*—George F. Lesmes
*Assistant Examiner*—Christopher Brown
*Attorney, Agent, or Firm*—Richard J. Schlott; Stephen L. Hensley

[57] ABSTRACT

Composites comprising structural fiber and matrix resin formulated from epoxys selected from the group consisting of polyglycidyl ethers of polycyclic bridged hydroxy-substituted polyaromatic compounds and N,N,N',N'-tetraglycidyl-bis(4-amino-3-ethylphenyl)methane with from about 6 to about 150 pbw, per hundred parts by weight of the epoxy resin components, of a solid aromatic diamine hardener, toughened with porous rigid resin particles having a spheroidal spongy structure. The resulting composites exhibit surprising improvement in interlaminar strength characteristics as measured by $G_{IC}$.

18 Claims, No Drawings

TOUGHENED FIBER-REINFORCED COMPOSITES

BACKGROUND OF THE INVENTION

This invention relates to composite materials and more particularly to tough, impact-resistant fiber-reinforced composites. Still more particularly, this invention relates to toughened composites comprising continuous fiber embedded in unique epoxy matrix resin formulations toughened with novel particulate modifiers, and to methods for producing such composites.

Fiber-reinforced composites are high strength, high modulus materials which are finding wide acceptance for use in sporting goods and in producing consumer items such as appliances. Composites are also finding increased acceptability for use as structural components in automotive applications, as components of buildings and in aircraft. When used in structural applications the composites are typically formed of continuous fiber filaments or woven cloth embedded in a thermosetting or thermoplastic matrix. Such composites may exhibit considerable strength and stiffness, and the potential for obtaining significant weight savings makes them highly attractive for use as a metal replacement.

The composites industry has long been involved in finding ways to further improve the mechanical properties of composite materials used in structural applications. Considerable effort has been expended over the past two decades directed toward the development of composites with improved fracture toughness. Inasmuch as most of the commonly employed matrix resins, as well as many of the reinforcing fibers, are generally brittle, much of that effort has gone into a search for components having better toughness characteristics. As a consequence, the search for toughened matrix resins has become the subject of numerous recent patents and publications, and numerous formulations have been made available to the composite industry through these efforts.

The methods used for toughening engineering resins have been adapted for the toughening of the matrix resins commonly used in composite structures, as shown for example by Diamant and Moulton in "Development of Resin for Damage Tolerant Composites—A Systematic Approach", 29th National SAMPLE Symposium, Apr. 3-5, 1984. The forming of alloys and blends by adding a more ductile thermoplastic such as a polysulfone to an epoxy resin formulation has also been shown to improve the ductility of the epoxy resin and provide enhanced toughness, according to British patent 1,306,231, published Feb. 7, 1973. More recently, combinations of an epoxy resin with terminally functional thermoplastics were shown to exhibit enhanced toughness. See U.S. Pat. No. 4,498,948. Still more recently, curable combinations of epoxy resins and thermoplastics with reactive terminal functionality were also said to improve the toughness of specifically formulated matrix resins, provided that the neat resin after curing exhibits a specific phase-separated morphology having a cross-linked glassy phase dispersed within a glassy continuous phase. See U.S. Pat. No. 4,656,208. Further improvements are said to be achieved by including a reactive rubbers component which is said to be contained within the cross-linked dispersed glassy phase. See U.S. Pat. No. 4,680,076. Still more recently, the use of an infusible particle made from a rubber dispersed within the phase-separated cross-linked epoxy resin matrix has been suggested for toughening composites based on such matrix resins. See U.S. Pat. No. 4,783,506.

Although the addition of rubber, thermoplastics and the like generally improves the ductility and impact resistance of neat resins, the effect on the resulting composites is not necessarily beneficial. In many instances the increase in composite toughness may be only marginal, and a reduction in high temperature properties and in resistance to environmental extremes such as exposure to water at elevated temperatures is frequently seen.

An alternative approach to producing toughened composites has been the development of layered composite structures having layers formed of fibers imbedded in a matrix resin alternated with layers formed of a thermoplastic resin, described in Japanese patent application 49-132669, published May 21, 1976. More recently, in U.S. Pat. No. 4,604,319, there were disclosed layered fiber-resin composites having a plurality of fiber-reinforced matrix resin layers inter-leafed with thermoplastic layers adhesively bonded to the reinforced matrix resin layers. Inter-leaf structures are ordinarily produced by impregnating continuous fiber to form prepreg, then laying up the composite by alternating prepreg with sheets of thermoplastic film. The laid-up structure is then subjected to heat and pressure, curing the matrix resin and bonding the layers. The patent also discloses inter-leaf layers which comprise a thermoplastic filled with a reinforcing material such as chopped fibers, solid particles, whiskers and the like.

Although inter-leafed composite structures with improved toughness have been disclosed, there has been some sacrifice in other physical properties, including a reduction in glass transition temperatures together with an increase in creep at high temperatures. Further difficulties with such composites may include a loss in stiffness for many such compositions, adhesive failure that may occur between layers formed of dissimilar resins and property deterioration during use due to poor solvent resistance. In addition, prepregs based on thermoplastic resin generally are lacking in tack, which complicates their fabrication into composites and increases the degree of skill needed to fabricate complex structures. This may in turn result in increased scrap losses and a need for more complex quality control procedures, increasing manufacturing costs in order to achieve an acceptable level of reliability.

Recently, the use of an infusible particle made from a rubber dispersed within a phase-separated cross-linked epoxy resin matrix has been suggested for toughening composites based on such matrix resins. See U.S. Pat. No. 4,783,506. Dispersing rigid particulate modifiers in the matrix resin has also been disclosed in the art for toughening composite materials, and has been described for examples in published European Patent Applications 0 274,899 and 0 351,025 as well as in U.S. Pat. No. 4,863,787, the teachings of these latter three publications being hereby incorporated by reference.

Most advanced composites are fabricated from prepreg, a ready-to-mold sheet of reinforcement impregnated with uncured or partly cured matrix resin. In order to be useful in commercial fabrication operations, prepreg needs to have a long out-time, defined as the period of time the prepreg can remain at room temperature and still be useful for making composites. For use in layups with complex contours the prepreg also must be pliable, and remain pliable in storage. Preferably the prepreg surface will also have and retain good tack. Pliability in prepreg is conferred by the matrix, which should remain soft and deformable to avoid cracking during fabrication.

The matrix resins most widely used for such prepreg systems are epoxy-based formulations, and many comprise an epoxy resin and aromatic amine hardener. The aromatic diamine hardener preferred for a wide variety of commercial applications has been 4,4'-diaminodiphenyl sulfone (DDS). DDS has a low level of reactivity with epoxy resins at room temperature, and prepreg made using DDS-based epoxy resin formulations generally has the desired long out-times. However, most epoxy matrix resin formulations based on DDS require further modification to overcome the low toughness that is characteristic of composites made from these resin formulations.

The isomeric form of DDS, 3-3'-diaminodiphenyl sulfone or 3,3'-DDS, is known in the art to be an effective hardener for epoxy resins. The reactivity of 3,3'-DDS is generally greater than DDS, and epoxy formulations based on this diamine generally have very short shelf life due to the greater reactivity. Although composites made from epoxy formulations based on 3,3'-DDS are known to exhibit improved toughness, the shorter shelf life makes the manufacture of useful prepreg from such formulations a much more difficult task. Alternative diamines having lower reactivities, as well as a variety of cure inhibitors for use in slowing the cure rate of these highly reactive systems, have also become available to formulators of matrix resins, and some of these have found acceptance in the art. In order to produce fully-cured composites and attain the maximum possible toughness and resistance to environmental attack, many slow-cure systems require extended curing cycles and post-curing operations, and often require temperatures well above the 350° F. curing temperature ordinarily preferred by the composite fabricating art. Such formulations are not preferred by fabricators, and have not been well-accepted.

Several methods for improving the damage tolerance characteristics of composites thus are known in the art. However, many of these prior art compositions including those toughened by including particulate modifiers may be poor in other important properties such as fabricability. Moreover, even when toughened to provide good damage tolerance, many laminate structures fabricated from these prior art compositions exhibit failure due to inadequate interlaminar strength characteristics. Improved composite materials having better resistance to impact, better compressive strength after impact and a high level of interlaminar strength as measured by $G_{IC}$ and methods for their preparation are thus needed. In the fabrication of such improved composites, matrix resins with extended shelf life and out-times capable of being fully cured in conventional fabricating operations using 350° F. curing cycles are needed to permit better handling and more practical storage, so that prepreg made from such resins would have the improved storage-stability needed for the production of complex layups. Such improved composite material formulations could find rapid acceptance by resin formulators and composite manufacturers, displacing the more complex composite materials currently available for these purposes as well as the expensive and difficult manufacturing processes used in their manufacture.

SUMMARY OF THE INVENTION

The present invention is directed to improved composites, and more particularly to composite materials comprising in combination epoxy-based matrix resins formulated to have excellent room temperature storage stability, continuous structural fiber and porous polyamide resin particles. Such composite materials exhibit an unusual and surprising combination of damage tolerance, toughness and interlaminar strength characteristics.

Prepreg compositions according to this invention have excellent tack and exhibit the highly unexpected property of retaining tack unchanged for weeks when stored at room temperature. The prepreg compositions are laid up to form laminates and composite articles and then processed in conventional processing equipment using curing cycles at 350° F. to provide the toughened composite structures of this invention.

DETAILED DESCRIPTION

Composites according to this invention comprise structural fiber embedded in an epoxy-based matrix resin formulation.

The matrix resin formulations useful in forming prepreg and composites in the practice of this invention comprise certain epoxy resins having dispersed therein a solid aromatic diamine hardener which is at room temperature insoluble in an amount effective to cure the resin formulation, and which at least partially dissolves when heated to a temperature at or near the processing temperature employed for curing the prepreg. By room temperature is meant a non-critical range of temperatures normally encountered in work spaces employed for fabrication of composites, generally estimated to be in the range of from about 50° to about 110° F. Conventional cure temperatures used in the manufacture of composites will be understood to lie in the range of from 300° to 370° F., preferably 325° to 360° F., and still more preferably will be at or near a temperature of about 350° F.

The diamine hardener will be selected to have no significant solubility in the epoxy resin component at room temperature, and to dissolve at least partially at a temperature near the cure temperature contemplated for processing prepreg made from the formulation. When the formulation is heated to the processing temperature the diamine hardener will become partly dissolved and will then be present in solution as a highly reactive hardener for the epoxy resin component, providing fully-cured, substantially homogeneous resin using conventional or even shortened curing cycles. Although the particular aromatic diamine selected for use as a hardener will thus depend upon the specific epoxy resin component of the formulation, the diamine preferred for use with the specific epoxy resins employed in the practice of this invention will be 3,3'-diaminodiphenyl sulfone.

The epoxy resin component for use in the matrix resin formulations of this invention will be selected from epoxy resins in which the diamine hardener, preferably 3,3'-diaminodiphenyl sulfone, remains substantially undissolved after long periods at room temperature. The preferred epoxy resins are selected from the group consisting of polyglycidyl ethers of polycyclic bridged hydroxy-substituted polyaromatic compounds and N,N,N',N'-tetraglycidyl-bis(4-amino-3-ethylphenyl)methane, as well as mixtures thereof. The polyglycidyl ethers of polycyclic bridged hydroxy-substituted polyaromatic compounds may be further represented by the structural formula

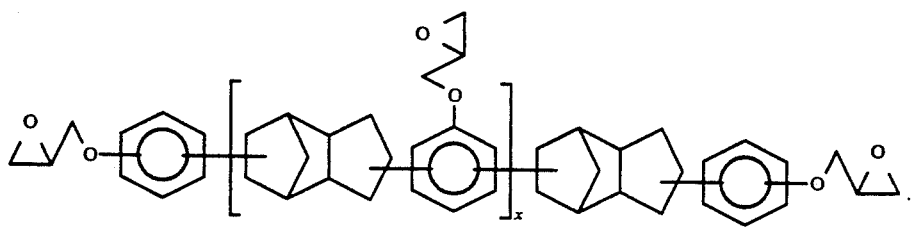

The epoxy resin of the structural formula will ordinarily be a mixture of compounds, and the value of x, which will lie in the range of from 0 to about 5, will therefore ordinarily be an average value for the mixture, rather than an integer.

It will be understood that the aforesaid polyglycidyl ethers are oligomeric materials obtained by conventional and well-known methods for the production of epoxide resins such as, for example, by reaction of the corresponding polycyclic bridged hydroxy-substituted polyaromatic compound with epichlorihydrin. The precursor polycyclic bridged hydroxy-substituted polyaromatic compound may in turn be obtained by a polyalkylation of a phenol with an unsaturated polycyclic aliphatic compound such as dicyclopentadiene. Such precursors are well-known in the art and have been described, for example, in published PCT application WO 85/02184. One such epoxy resin is available from Dow Chemical Company under the tradename Tactix 556.

The tetraglycidyl epoxy resin set forth above can be readily obtained by conventional processes from the corresponding diamine, and such tetraglycidyl epoxy resins are available commercially. For example, a mixture comprising about 40 mole % N,N,N',N'-tetraglycidyl-bis(4-amino-3-ethylphenyl) methane, about 47 mole % (4-diglycidylamino-3-ethylphenyl)-(4-diglycidylamino-phenyl) methane, and about 12 mole % N,N,N',N'-tetraglycidyl-bis(4-aminophenyl) methane is available as RD87-160 from Ciba-Geigy, while a distilled form of N,N,N',N'-tetraglycidyl-bis(4-amino-3-ethylphenyl) methane is available as XUMY722 from the same source.

Although the particular epoxy resins specified to be useful in the practice of this invention are dissimilar in structure, the resins have in common the characteristics that the aromatic diamine selected as the diamine hardener, preferably 3,3'-diaminodiphenyl sulfone, will be insoluble therein at room temperature and will be dissolved at elevated temperatures. Thus, when the epoxy and the pulverized solid diamine are mixed and held at room temperature a substantially inhomogeneous mixture is formed which, upon heating to the elevated temperatures required for curing, will form a substantially homogeneous solution.

Suitable epoxy resin formulations may be prepared according to methods and practices well known and widely used in the resin art. Generally the matrix resin formulations will comprise greater than 2 parts by weight (pbw) diamine hardener per hundred parts by weight epoxy resin. Although the particular level of hardener selected will depend in part upon the particular epoxy and diamine employed and the stoichiometric ratio needed to accomplish the degree of cross-linking desired for the envisioned end use, preferably at least 3 pbw and more preferably from about 6 to about 150 pbw diamine hardener per hundred pbw epoxy resin will be used. The amount of each component selected will depend upon the molecular weights of the individual components and the molar ratio of reactive amine (N-H) groups to epoxy groups desired in the final matrix resin system. For most prepreg and composite applications, sufficient diamine hardener will be used to provide a molar ratio of N-H groups to epoxide groups in the range of from about 0.3/1 to 1.8/1, preferably from 0.4/1 to 1.3/1.

The formulations may further include a thermoplastic polymer to impart improved toughness to the resulting composite by increasing the ductility and impact resistance of the cured resin formulation. When dissolved in the formulation prior to curing, thermoplastics may also increase the viscosity and film strength of the uncured resin, thereby improving the resin processability for use in impregnating operations, and can provide prepreg with better handling characteristics for use in composite manufacture. A variety of thermoplastics are known in the art for use in combination with epoxy resins, for example, polyaryl ethers such as polyaryl sulfones and polyaryl ether sulfones, polyether ketones, polyphenylene ethers and the like, as well as polyarylates, polyamides, polyamide-imides, polyether-imides, polycarbonates, phenoxy resins and the like. Where the purpose for including the thermoplastic is to improve the viscosity, processability and handling characteristics, the thermoplastic selected will necessarily be soluble in the uncured epoxy resin formulation. The proportion of thermoplastic employed will depend in part upon the thermoplastic selected and the particular end use envisioned. However, for most purposes, where a thermoplastic is employed the formulation will comprise greater than 1 wt %, preferably from about 5 to about 30 wt %, of the combined weight of diamine hardener and epoxy resin components, i.e. from 5 to about 30 pbw per hundred pbw of combined hardener and epoxy resin components.

The epoxy formulations may additionally include an accelerator to increase the cure rate when the formulation is heated to prepreg processing temperatures. The accelerators will be selected from among those widely known and used in the epoxy resin formulating art and may be employed in conventional amounts. Accelerators which may be found effective for these purposes include Lewis acid:amine complexes such as $BF_3$:monoethylamine, $BF_3$:triethanolamine, $BF_3$:piperidine and $BF_3$:2-methylimidazole; amines such as imidazole, 1-methyl imidazole, 2-methyl imidazole, N,N-dimethylbenzylamine and the like; acid salts of tertiary amines such as the p-toluene sulfonic acid:imidazole complex and the like, salts of trifluoromethane sulfonic acid such as FC-520 (obtained from 3-M Company), organophosphonium halides, dicyandiamide, 4,4'-methylene bis(-phenyl-dimethyl urea) and 1,1-dimethyl-3-phenyl urea. Mixtures of such accelerators may also be employed. For some applications it may also be desirable to include dyes, pigments, stabilizers, thixotropic agents and the like, and these and other additives may be included as needed at levels commonly practiced in the composite art. Upon curing, the resin formulations, exclusive of any particulate additives, fillers and reinforcement which may be employed, will form a substantially single, continuous rigid phase.

THE PARTICULATE MODIFIERS

The composites of this invention are toughened by incorporating rigid particles into the matrix resin component according to methods and processes recently disclosed in the art. More particularly, the resin particles will be formed of a polyamide resin and may be described as porous in that the structure of the particles will be essentially spheroidal and sponge-like. The porous polyamide particles generally have a mean diameter between 1 and 75 microns, preferably from about 1 to about 25 microns, and still more preferably from about 2 to about 15 microns.

An essential characteristic of the particles useful in the practice of this invention is that they are highly porous, that is, the porous polyamide particles comprise internal pores and have a high surface area, substantially greater than would be observed for smooth, spherical particles or irregular particles obtained by crushing a brittle substance. Various methods may used for demonstrating and measuring their porosity. For example, powder formed of such porous polyamide particles will have a large specific surface, ordinarily substantially greater than 5 $m^2/g$, and preferably a specific surface greater than about 9 $m^2/g$, while ordinary smooth particles have a specific surface on the order of 1–2 $m^2/g$. The effectiveness of particles for improving composite toughness appears to improve with increase in porosity, at least over the range of particle porosity that has been examined, and no upper limit for effectiveness has yet been determined. Particles with a specific surface greater than 30 $m^2/g$ and even as great as 64 $m^2/g$ are found to be particularly useful in the practice of this invention. The specific surface for such powders is determined according to the classical BET method.

Particle porosity may also be demonstrated and determined by other techniques. For example, pore volume may be considered a measure of porosity for such particles and the polyamide particles useful in the practice of this invention typically have high pore volumes, preferably greater than about 1.5 $cm^3/g$ to as great as 3.5 $cm^3/g$ or even greater when determined as intrusion volume on the particles in bulk form. Smooth spherical particles, on the other hand, have pore volumes on the order of 1.1–1.8 $cm^3/g$. The measurement of intrusion volume on the bulk particles will necessarily include the interstitial space of the bulk particles, and when the value is corrected to exclude the interstitial space or interparticle volume for the bulk material to thus provide the intrusion pore volume for the particles, the pore volume of particles useful in the practice of this invention determined by this method will be found to be well above 0.3 cc/g, and preferred will be particles with pore volumes of at least 0.4 cc/g or greater. Particles with pore volumes greater than 0.6 cc/g are found to be highly effective for toughening composites and such particles will therefore be particularly preferred.

It will be understood that porous polyamide particles in other physical forms such as flake, cylindrical polyamide particles or fibrid-like materials may also be useful in the practice of the invention. However, methods for producing porous particles in these alternate forms are not readily available, and such forms are not preferred.

The porous polyamide particles useful in the practice of this invention may be formed of any rigid polyamide. The polyamide selected will have, in its final particle form, sufficient thermal resistance, hardness and rigidity to resist being melted, compressed or flattened under the pressures and temperatures that will be encountered during the fabricating and curing of the laminate. In addition, the polyamide will be selected to be substantially insoluble in the matrix resin formulation prior to gelation, in order to preserve the unique surface characteristics of the particle.

The polyamide resins that may be used will include any of the readily available nylon resins such as polycaprolactam (nylon 6), poly(hexamethylene diamine sebacamide (nylon 6,6), polyundecanoamide (nylon 11), polydodecanoamide (nylon 12) and the like. The preparation of particles from such resins with the requisite porosity has been described in the art, for example in U.S. Pat. No. 4,831,061, the teachings of which are incorporated herein by reference, as well as in U.S. Pat. No. 2,359,877 and in Japanese published application 62-240325. A variety of porous polyamide particles and porous nylon-coated particulates such as titanium dioxide particles which may be suitable for use in the practice of this invention are available, including nylon 12 particles, obtainable from Sekisui Plastics (Japan) under the tradename Porouslen 12, as well as nylon 6 particles, available as Porouslen 6 particles from the same source. Nylon 12 particles are also available in a variety of grades under tradenames such as Orgasol from Atochem (France), and from Huls (Germany) under the tradename Vestosint, while nylon 11 particles are available from Atochem under the Rilsan tradename.

The particulate modifiers used in the fabrication of composites may comprise only the porous polyamide particles of this invention or may be mixtures of such particles with non-porous particles formed for example from a cross-linked rubber or from a rigid resin such as polystyrene, polyphenylene ethers, polysulfones or the like, including any of the wide variety of particulate modifiers that are known in the art for use in toughening composites.

The use of resin particles for toughening of composite materials has been disclosed, for example, in published European patent applications 0 274,899 and 0 351,025, as well as in U.S. Pat. No. 4,863,787. The particulate modifiers used in the fabrication of composites according to the art include those comprising a finely divided rigid resin such as a thermoset resin, including cured formulations based on epoxy resins, phenolic resins, melamine resins and the like. Also suitable according to the art are thermoplastic resin particles, which may be formed from any of the widely-available rigid thermoplastics known in the art, including the engineering resins such as polyamides, polyimides, polyamide-imides, polyarylates, polycarbonates, polyaryl ethers, polyaryl ketones, polyaryl sulfones and the like, as well as many of the more rigid molding resins and textile fiber resins widely available, including polyacrylonitrile, polyvinyl chloride, cellulosic resins, methylmethacrylate resins and the like.

Although polyamide particles are among the particles that have been suggested in the art for use in producing particle-toughened composites, the art does not teach the use of porous particles for these purposes. Indeed, the art has recognized that the use of fine particles has a detrimental effect on the handling characteristics and has sought to overcome these effects by such techniques as minimizing the surface area of the particles. For example, it has been noted in published European Patent Application 0 274 899 that the addition of fine particles to matrix resin formulations increases the resin viscosity. According to the further disclosure of this European Patent Application, the observed increase in viscosity results from the increase in surface area that occurs as a consequence of reduction in particle size. As is well known, a high resin viscosity makes it difficult to coat the resin or to produce prepreg by forming resin films using a coating process. The reference recommends avoiding such high surface area particles, turning instead to fine particles that are formed spherically to minimize surface area. The use of spherical particles with minimized surface area greatly suppresses the effect on matrix resin viscosity and gives a viscosity increase of less than 1:2 compared with formulations incorporating particles having an indefinite shape and higher surface area such as may be obtained by crushing a rigid resin.

The porous particles employed in the practice of this invention are produced specifically to be highly porous and have a very large surface area, far greater than for particles produced for example by crushing operations. A substantial increase in resin viscosity, on the order of from three- to five-fold, is generally observed for matrix resin formulations comprising these highly porous particles.

THE COMPOSITE STRUCTURES

The toughened composite structures of this invention comprise discrete layers formed of continuous structural fiber embedded in a matrix resin, the layers or plies being separated or spaced normally apart, the layer surfaces defining laminar regions or spacing layers comprising matrix resin filled with the porous resin particles. The particles serve to separate the plies, and the thickness of the ply spacing will thus be directly related to the particle size.

As used herein, the term "particle size" refers to the particle dimension determining the ply separation, which for small, irregular or substantially spherical particles is ordinarily the particle diameter. Inasmuch as it will not be practical in most instances to obtain particles uniform in size throughout, the particulate modifiers will ordinarily comprise mixtures of particles encompassing a variety of particle sizes. The particle size may be determined by any of the variety of standard methods, such as by use of a Coulter counter or "Multisizer" apparatus, or by a Granulometer device. Particle modifiers useful and effective in toughening composites according to the practice of this invention have the majority of the particles with a mean diameter lying in the range of from 1 to about 75 microns. Mixtures of powdered particulate materials suitable for the purposes of this invention may be obtained by classifying particle mixtures using well-known methods such as screen classification and the like.

Use of particulate mixtures comprising a wide variety of particle sizes may have other detrimental effects and therefore be less preferred. Dispersing mixtures of particles in the matrix resin formulation uniformly may be made more difficult by the presence of very large particles, and the coating characteristics of the filled resins will be more variable. The presence of a small number of very large (>50 micron) particles widely dispersed in the film of uncured filled matrix resin adhered to one or both surfaces of a prepreg tends to create significant peaks or high spots at the outer surface. The presence of such high spots has the effect of an apparent surface roughness, reducing the surface tack of the prepreg by preventing full and effective contact between layers in a layup operation. The reduced tack will be particularly noticeable for particle mixtures that comprise a wide distribution of particle sizes, hence, narrowly disperse particle mixtures will be preferred.

The proportion of each component employed in fabricating the toughened composites of this invention will depend in part upon the end use envisioned, as well as on the particular resin, fiber and resin particles selected. Overall, the composites will comprise from about 20 to about 80 wt % continuous fiber, the balance comprising matrix resin and particles, with the particles amounting to from 1 to about 25 wt % based on combined weight of the particles and the matrix resin formulation. Although the level of resin particles needed to toughen the composite will lie within the stated range, the optimum level will necessarily vary depending upon the type of matrix resin, the fiber loading, the particle type and similar factors, and must therefore be determined for the particular fiber and resin system employed. In general, it will be desirable to employ the lowest level of particles that will impart the desired improvement in composite toughness. Although greater than optimum levels may be employed, further improvements in toughness will be marginal, and other physical properties such as hot/wet strength may be detrimentally affected. Composites having a very high fraction of the particles located in the interply spacing are believed to be most effective in providing improvements in toughness at a minimum level of particles.

COMPOSITE FABRICATION

In fabricating composites, the matrix resin formulation will be first combined with continuous fiber reinforcement or structural fibers and formed into a prepreg prior to curing. Suitable structural fiber may be characterized in general terms as having a tensile strength of greater than 100 kpsi and a tensile modulus of greater than two million psi. Fibers useful for these purposes include carbon or graphite fibers, glass fibers and fibers formed of silicon carbide, alumina, titania, boron and the like, as well as fibers formed from organic polymers such as for example polyolefins, poly(benzothiazole), poly(benzimidazole), polyarylates, poly(benzoxazole), aromatic polyamides, polyaryl ethers and the like, and may include mixtures comprising two or more such fibers. Preferably the fibers will be selected from glass fibers, carbon fibers and aromatic polyamide fibers such as the fibers sold by the DuPont Company under the trade name Kevlar. The fibers may be used in the form of continuous tows of typically from 500 to 420,000 filaments, as continuous unidirectional tape or as woven cloth. Carbon fiber will be preferred for most composite applications.

Methods well known and ordinarily widely used in the composite art for the production of layered composites may be readily adapted for fabricating the prepreg. Most commonly, the prepreg comprises an impregnated tape comprising uniformly disposed, parallel filaments of continuous fiber or may comprise resin-impregnated fabric woven from continuous fiber tow. These impregnated fiber structures, designated prepreg, may be produced by impregnating tape or fabric with matrix resin formulation in an uncured state using any convenient method conventionally employed in the art including melt coating, calendaring, dip impregnation with a resin solution or molten resin, melt pressing the tape or fabric into a film of the matrix resin or the like.

The composite will then be formed by laying up sheets or tapes of the prepreg to form a layered stack of lay-up, and curing the lay-up, usually with heat and under pressure. The prepreg layers, each comprising continuous fiber and matrix resin in uncured form, will have their adjoining surfaces adhered upon curing to form a single structure having discrete layers of continuous fiber embedded in an essentially continuous and substantially homogeneous matrix resin phase.

It will be necessary to distribute the modifier particles uniformly between each of the prepreg layers. A variety of methods may be used for this purpose, and the placing of particles at a surface of the prepreg may be carried out as a separate step prior to or during the lay-up operation, or integrated into the step of impregnating the tape or woven fabric. The former will be referred to as two-step processes, while the latter are termed one-step processes. Such processes are now well known in the art and have been described, for example, in published European Patent Applications 0 274,899 and 0 351,025 as well as in U.S. Pat. No. 4,863,787, the teachings of these publications being hereby incorporated by reference.

The invention will be better understood by consideration of the following Examples, which are provided by way of illustration of the invention and are not intended to be limiting thereof. In the Examples, all parts are by weight, and all temperatures are given in centigrade unless otherwise noted.

EXAMPLES

The following materials and formulations are employed in the Examples.

Epoxy-1: A mixture of tetraglycidyl derivatives of aromatic amines comprising about 40 mole % N,N,N',N'-tetraglycidyl-bis(4-amino-3-ethyl-phenyl)methane, about 47 mole % (4-diglycidylamino-3-ethyl-phenyl)-(4-diglycidylaminophenyl) methane and about 12 mole % N,N,N',N'-tetraglycidyl-bis(4-aminophenyl) methane. An epoxy obtained as RD 87-160 from Ciba-Geigy.

Tactix 556: A mixture of oligomeric polyglycidyl ethers of polycyclic bridged hydroxy-substituted polyaromatic compounds. An epoxy obtained as Tactix 556 from Dow Chemical Company.

MY9612: N,N,N'N'-tetraglycidyl-4,4'-methylene dianiline. An epoxy resin obtained as MY 9612 from Ciba-Geigy MY0510: O,N,N-triglycidyl p-aminophenol. An epoxy resin obtained as MY 0510 from Ciba-Geigy 3,3'-DDS: 3,3'-diaminodiphenyl sulfone. An aromatic diamine hardener, obtained as HT-9719 from Ciba-Geigy.

Omicure 94: N,N-dimethyl-N'-phenyl urea, cure accelerator obtained from Omicron Chemicals.

PEI: Polyether imide thermoplastic resin obtained as Ultem 1000 from the General Electric Company PES: Polyether sulfone thermoplastic resin obtained as Victrex 200 from ICI, Ltd.

PARTICLES

Porous Nylon: Porous Nylon 12 particles, average particle size of 10 microns, BET surface area of 18.2 $m^2/g$, and pore volume of 3.53 $cm^3/g$, obtained as Porouslen 12 from Sekisui Plastics, Japan.

PPO: Resin particles having median size 12 microns, 100% less than 28 microns in size, were prepared from poly(2,6-dimethyl phenol), obtained as PPO resin from the General Electric Company. The resin powder was obtained by micropulverization, and classified by screening. The particles had a BET surface area of 9.6 $m^2/g$ and a pore volume of 1.54 $cm^3/g$.

FIBERS

Carbon fiber: Thornel® T 40 grade carbon fiber from Amoco Performance Products, Inc. This fiber typically has a filament count of 12,000 filaments per tow, a yield of 0.44 g/m, a tensile strength of 810 kpsi, a tensile modulus of 42 mpsi and a density of 1.81 g/cc.

In the Examples, ribbon formed from the fiber was used to prepare prepreg having fiber areal weights of 140 to 150 $g/m^2$.

TEST PROCEDURES

Compression After Impact Test (CAI)

This procedure, referred to as the Compression After Impact test or CAI, is generally regarded as a standard test method in the industry. The test specimens are panels measuring 6×4 in., cut from 32 ply fiber-reinforced composite sheets. The panels are first impacted by being subjected to an impact of 1500 in-lbs/in at the center in a Gardner Impact Tester, using a 5/8 in. diameter indenter; a panel thickness of 0.177 in. was assumed. The impacted panel is then placed in a jig and tested edgewise for residual compressive strength. The details are further described in "NASA Contractor Report 159293", NASA, August, 1980.

Double Cantilever Beam test (DCB)

This procedure has become widely used to measure interlaminar Mode I critical strain energy release rate ($G_{IC}$) for fiber-reinforced composite materials. The specimen employed is a unidirectional laminate having an insert fabricated at one end, midway through the thickness and in the laminar plane, to provide the initial crack front which is then propagated through the specimen during the test. Hinges are bonded to both faces of the specimen at the end where the insert is located, and a tensile load is applied via the hinges to literally rip apart the laminate in a controlled fashion. The energy required to propagate the crack front, $G_{IC}$ is measured at several points during the test and averaged to determine the specimen $G_{IC}$ value. The specimens employed in the following tests were 1.0 inch × 10.0 inch strips of 24-ply, unidirectional laminates having a 1.0 inch square folded Teflon film insert between the 12th and 13th plies. The test was run in an Instron tester using a crosshead displacement rate of 0.05 in/min at room temperature. The values reported for $G_{IC}$ in the following examples were calculated from:

$$G_{IC} = \frac{3000\, P\, \delta}{2\, a\, b}$$

where P is the load in newtons, δ=deflection, a=crack length and b=specimen width (all length measurements in millimeters).

The methods of the following Examples are representative of those that may be employed for preparing the resin formulations, prepreg and composites useful in the practice of this invention. The processes will be generally recognized by those skilled in the art as processes and methods commonly employed for the production of thermoset resin formulations and composites.

PREPREG AND COMPOSITE FABRICATION

In the following examples, matrix resin formulations according to this invention are combined with continuous structural fiber to form prepreg and then fabricated into composite articles toughened with porous particles.

EXAMPLE 1

A mixture of 800 g of Tactix 556 epoxy resin and 800 g of Epoxy-1 epoxy resin was placed in a 5 liter resin flask and heated to 110° C. A solution of 165 g of PEI thermoplastic dissolved in 3000 g of methylene chloride was added with stirring over a 1.5 hr. period, and then solvent was removed. The mixture was degassed by heating and stirring the mixture at 110° C. and vacuum for 45 min. to remove residual solvent before adding 590 g of 3,3'-DDS and stirring for 25 minutes to disperse the diamine. The resin was then discharged and cooled. The resin mixture had a Brookfield viscosity of 12,500 cps.

Prepreg with Porous Nylon modifier particles dispersed on one side thereof was prepared by the two-step process using T40 carbon fiber, as follows:

A sample of the resin, 86 pbw, was charged to a sigma blade mixer and allowed to warm to room temperature. Porous Nylon particles, 14 pbw, were added and the mixture was sheared for about 60 min. to disperse the particles uniformly, giving a resin temperature of about 70° C. A film of the filled resin was prepared at a coating weight of 33 g/m$^2$. Then, using a prepreg machine, the film was combined with separately-prepared prepreg tape having a fiber content of 77 wt % and a fiber areal wt. of 145 g/m$^2$, prepared from carbon fiber and the unfilled resin.

The final prepreg tape had a fiber content of 37 wt % and a fiber areal weight of 145 g/m$^2$, with Nylon 12 particles dispersed in the resin coating on one surface. The 12" prepreg tape was then laid up into 15×15 laminates using a ply configuration of [+45/90/−45/0]$_{4s}$ and then cured in an autoclave under 90 psi pressure at 355° for 2 hr. The resulting composite panel had a panel thickness of 0.197 in. The panel, after cooling, was used to provide test specimens for CAI evaluation. The composite had a CAI value of 47.6 kpsi. A 24-ply, unidirectional laminate test specimen, prepared as described for DCB testing, gave a $G_{IC}$ value of 682 J/sq.m. (standard deviation of ±102).

EXAMPLE 2

Base Resin

A mixture of 875 g of Tactix epoxy resin and 850 g of N,N,N',N'-tetraglycidyl-bis(4-amino-3-ethylphenyl) methane obtained as XUMY722 from Ciba-Geigy, was placed in a resin flask, followed by a solution of 125 g of PEI thermoplastic dissolved in 1000 g of methylene chloride. Solvent was removed by heating and stirring the mixture to 110° C., and then applying vacuum at 110° C. for 30–45 min., before cooling to 100° C. and adding 650 g of 3,3'-DDS. The mixture was stirred to thoroughly disperse the diamine and produce a non-homogeneous mixture with suspended solid diamine dispersed throughout, and then discharged.

Interleaf Resin

A mixture of 602 g of Tactix epoxy resin and 584 g of XUMY722 epoxy resin (a distilled form of N,N,N',N'-tetraglycidyl-bis(4-amino-3-ethylphenyl) methane also obtained from Ciba-Geigy) was placed in a resin flask, followed by a solution of 86 g of PEI thermoplastic dissolved in 688 g of methylene chloride. Solvent was removed by heating and stirring the mixture to 110° C., and then applying vacuum at 110° C. for 30–45 min., before cooling to 100° C. and adding a mixture of 448 g of 3,3'-DDS and 280 g of Porous Nylon particles. The mixture was stirred to thoroughly disperse the diamine and produce a non-homogeneous mixture with suspended solid diamine and nylon particles dispersed throughout, and then discharged.

The Base resin and Interleaf resin formulations were then used to form prepreg following the two-step method, using T40 carbon fiber. The final prepreg tape had a fiber content of 37 wt % and a fiber areal weight of 145 g/m$^2$, with Nylon 12 particles dispersed in the resin coating on one surface. The 12" prepreg tape was then laid up into 15×15 laminates using a ply configuration of [+45/90/−45/0]$_{4s}$ and then cured in an autoclave under 90 psi pressure at 355° for 2 hr. The resulting composite panel, after cooling, having a panel thickness of 0.197 in. was used to provide test specimens for CAI evaluation. The composite had a CAI value of 47.6 kpsi. A 24-ply, unidirectional laminate test specimen, prepared as described for DCB testing, gave a $G_{IC}$ value of 856 J/sq.m. (standard deviation of ±58).

Control Example A

An epoxy resin formulation without particulate modifier was prepared substantially by the process of Example 2 and using the same base resin formulation. The interleaf resin formulation was then prepared as in Example 2 using the same resin formulation but substituting 113 pbw of PPO particles for the Nylon particles.

The Base resin and Interleaf resin formulations were then used to form prepreg following the two-step method and using T40 carbon fiber. The final prepreg tape had a fiber content of 37 wt % and a fiber areal weight of 145 g/m$^2$, with PPO particles dispersed in the resin coating on one surface. The 12" prepreg tape was then laid up into 15×15 laminates using a ply configuration of [+45/90/−45/0]$_{4s}$ and then cured in an autoclave under 90 psi pressure at 355° for 2 hr. The resulting composite panel had a panel thickness of 0.197 in. The panel, after cooling, was used to provide test specimens for CAI evaluation. The composite had a CAI value of 39.5 kpsi.

A 24-ply, unidirectional laminate test specimen, prepared as described for DCB testing, gave a $G_{IC}$ value of 283 J/sq.m. (standard deviation of ±27).

Control Example B

An epoxy resin formulation was prepared by heating a solution of 25.4 pbw of MY0510 epoxy and 37.3 pbw of MY9612 epoxy in 37.5 pbw of methylene chloride to 45° C. The mixture was stirred and methylene chloride was distilled while adding 15 pbw PES polyether sulfone. The stirred mixture was further heated to remove methylene chloride, finally to a reduced pressure of 28 in. and a temperature of 110° C. and held at that temperature for 1 hr. The 3,3'-DDS, 21.5 pbw, was then added over a 5 min. period and the mixture was then stirred at 100° C. for 1 hr., under a vacuum of 28 in. to remove residual solvent. The temperature was reduced to 90° C. and 0.2 pbw of the Omicure 94 was added, stirring was continued for 5 min. and the resin was discharged.

The resin was used as a base resin to prepare prepreg and composite using T40 carbon fiber by the two-step method, following substantially the process described in Example 2. The resin and Porous Nylon particles were combined at a ratio of 14 pbw of particles per 86 g of resin in the sigma blade mixer at about 50° C., and blended for about 2 hr. at 50°-75° C. to complete the dispersion of the particles. The final prepreg tape had a fiber areal weight of 145 g/m² and a resin content of 37.3 wt %. Composite specimens were prepared as in Example 1. The composite had a CAI value of 48.8 kpsi. A 24-ply, unidirectional laminate test specimen, prepared as described for DCB testing, gave a $G_{IC}$ value of 417 J/sq.m. (standard deviation of ±40).

Control Example C

The procedures of Example 2 were again followed in preparing a composite modified with substantially non-porous, 10 micron polyamide particles having a specific surface of 5.0 m²/g and a bulk pore volume of 1.73 cm³/g, obtained from Atochem as Orgasol Nylon 12 particles. The composite had a CAI value of 28 kpsi, substantially the same as a composite made without a particulate modifier.

The composites comprising matrix resin formulations according to this invention in combination with a structural fiber such as carbon fiber and porous polyamide particles meet the challenge of providing prepreg with good storage stability and acceptable out-times which are readily fabricated to form toughened composites with excellent damage tolerance characteristics as measured by CAI. Although the use of other particles such as PPO may also provide damage tolerant composites, as shown by the CAI value for the composite of Control Example A, the composite materials comprising porous polyamide particles according to this invention will be seen to have substantially improved interlaminar strength characteristics, as shown by comparing the $G_{IC}$ values for the composites of Examples 1 and 2 with the $G_{IC}$ values for the composites of Control Example A.

Improvement in the interlaminar strength characteristics for a composite appears to be a function of the matrix resin formulation as well as of the particles as will be seen by comparing the $G_{IC}$ values for the composite of Control Example B with those of the composites comprising the latent matrix resin formulations of this invention. It is highly surprising that even though the addition of the porous particles according to this invention to a different matrix resin formulation such as that of Control B provides a composite with excellent damage tolerance as shown by CAI value, the interlaminar strength characteristics of the Control Example B composite are significantly less, as reflected by the low value for $G_{IC}$. It is thus clear that the compositions of this invention also provide an unique solution to the problem of supplying damage tolerant composites with good interlaminar strength characteristics.

The invention will thus be seen to be a tough, damage-tolerant, fiber-reinforced composite which may be further described as a composition comprising a structural fiber embedded in a matrix resin formulation comprising an epoxy resin selected from the group consisting of polyglycidyl ethers of polycyclic bridged hydroxy-substituted polyaromatic compounds and N,N,N',N'-tetraglycidyl-bis(4-amino-3-ethylphenyl) methane, as well as mixtures thereof, and solid aromatic diamine hardener dispersed therein, toughened by including porous resin particles having a spheroidal spongy structure. The epoxy formulation may be further characterized as comprising greater than 2 pbw, preferably greater than 3 and still more preferably from about 6 to about 150 pbw of a diamine hardener per 100 pbw of said epoxy resin, while said particulate modifier will preferably be formed of a rigid resin, still more preferably a polyamide. The preferred diamine hardener for use with the epoxy components disclosed is 3,3'-diaminodiphenyl sulfone. The composite will comprise from 20 to 80 wt % structural fibers, preferably selected from glass fibers, carbon fibers and aromatic polyamide fibers and still more preferably carbon fibers, and from 1 to about 25 wt % of said porous particulate modifier. The composites will preferably have layered structure, wherein the continuous fiber forms a plurality of discrete plies defining layers of matrix resin filled with the porous particulate modifier.

The invention has been described and illustrated by way of specific embodiments set forth herein. Further modifications and variations will become apparent to those skilled in the resin formulating and composite fabricating art, and such variations and modifications will be included within the scope of the invention as defined by the appended claims.

We claim:

1. A composition comprising continuous structural fiber embedded in a matrix resin comprising (a) at least one epoxy resin selected from the group consisting of polyglycidyl ethers of polycyclic bridged hydroxy-substituted polyaromatic compounds and N,N,N',N'-tetraglycidyl-bis(4-amino-3-ethylphenyl) methane; (b) from about 6 to about 150 pbw, per hundred parts by weight of the epoxy resin components, of 3,3'-diaminodiphenyl sulfone diamine hardener; and (c) porous rigid polyamide particles having a spheroidal spongy structure, a mean diameter in the range of from about 1 to about 75 microns and a specific surface greater than about 5 m²/g.

2. The composition of claim 1 wherein said particles have a smallest dimension in the range of from about 1 to about 25 microns and a specific surface greater than about 5 m²/g.

3. The composition of claim 1 wherein said particles comprise from 1 to about 25 wt % of said matrix resin.

4. The composition of claim 1 wherein said matrix resin further comprises from about 5 to about 30 pbw, per hundred parts by weight of the combined hardener and epoxy resin, of a thermoplastic.

5. The composition of claim 4 wherein said thermoplastic is a polyaryl ether.

6. The composition of claim 1 wherein said matrix resin comprises polyglycidyl ethers of polycyclic bridged hydroxy-substituted polyaromatic compounds having the strutural formula

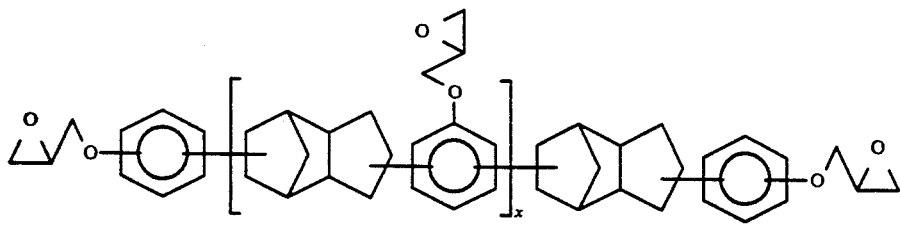

wherein x is an average value for the mixture and lies in the range of from 0 to about 5.

7. The composition of claim 1 wherein said matrix resin comprises N,N,N',N'-tetraglycidyl-bis(4-amino-3-ethylphenyl) methane.

8. The composition of claim 1 wherein said matrix resin comprises polyglycidyl ethers of polycyclic bridged hydroxy-substituted polyaromatic compounds and N,N,N',N'-tetraglycidyl-bis(4-amino-3-ethylphenyl) methane, the weight ratio of said polyglycidyl ethers to said tetraglycidyl compound being from about 4/1 to about 1/4.

9. The composition of claim 1 wherein said structural fiber is carbon fiber.

10. A layered, fiber-reinforced composite comprising continuous structural fiber embedded in a matrix resin comprising (a) at least one epoxy resin selected from the group consisting of polyglycidyl ethers of polycyclic bridged hydroxy-substituted polyaromatic compounds and N,N,N',N'-tetraglycidyl-bis(4-amino-3-ethylphenyl) methane; and (b) from about 6 to about 150 pbw, per hundred parts by weight of the epoxy resin components, of 3,3'-diaminodiphenyl sulfone diamine hardener; said continuous fiber forming a plurality of discrete plies defining layers comprising said matrix resin having dispersed therein porous rigid polyamide particles having a spheroidal spongy structure, a mean diameter in the range of from about 1 to about 75 microns and a specific surface greater than about 5 m²/g.

11. The composite of claim 10 wherein said particles have a smallest dimension in the range of from about 1 to about 25 microns and a specific surface greater than about 5 m²/g.

12. The composite of claim 10 wherein said particles comprise from 1 to about 25 wt % of said matrix resin.

13. The composite of claim 10 wherein said matrix resin further comprises from about 5 to about 30 pbw, per hundred parts by weight of combined hardener and epoxy resin, of a thermoplastic.

14. The composite of claim 10 wherein said structural fiber is carbon fiber.

15. The composite of claim 10 wherein said matrix resin comprises a mixture of polyglycidyl ethers of polycyclic bridged hydroxy-substituted polyaromatic compounds having the structural formula

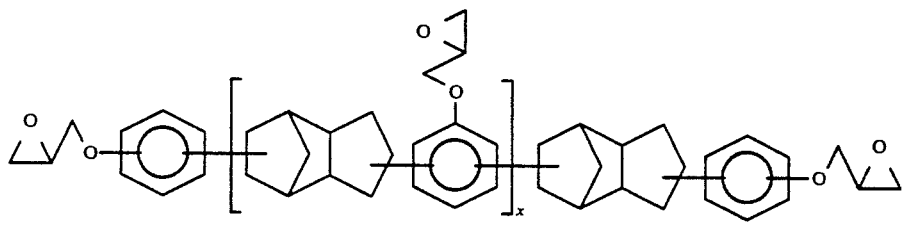

wherein x is an average value for the mixture and lies in the range of from 0 to about 5.

16. The composite of claim 10 wherein said matrix resin comprises N,N,N',N'-tetraglycidyl-bis(4-amino-3-ethylphenyl) methane.

17. The composite of claim 10 wherein said matrix resin comprises polyglycidyl ethers of polycyclic bridged hydroxy-substituted polyaromatic compounds and N,N,N',N'-tetraglycidyl-bis(4-amino-3-ethylphenyl) methane, the weight ratio of said polyglycidyl ethers to said tetraglycidyl compound being from about 4/1 to about 1/4.

18. The composite of claim 13 wherein said thermoplastic is a polyaryl ether.

* * * * *